(12) United States Patent
Taylor et al.

(10) Patent No.: US 10,002,448 B2
(45) Date of Patent: Jun. 19, 2018

(54) PRODUCING GLYPH DISTANCE FIELDS

(75) Inventors: Robert Joseph Taylor, Groton, MA (US); Qun Wu, Andover, MA (US)

(73) Assignee: Monotype Imaging Inc., Woburn, MA (US)

( * ) Notice: Subject to any disclaimer, the term of this patent is extended or adjusted under 35 U.S.C. 154(b) by 0 days. days.

(21) Appl. No.: 13/571,562

(22) Filed: Aug. 10, 2012

(65) Prior Publication Data
US 2014/0043339 A1 Feb. 13, 2014

(51) Int. Cl.
*G06T 11/20* (2006.01)
*G06T 11/40* (2006.01)
*G06T 11/60* (2006.01)

(52) U.S. Cl.
CPC ............ *G06T 11/203* (2013.01); *G06T 11/20* (2013.01); *G06T 11/40* (2013.01); *G06T 11/60* (2013.01)

(58) Field of Classification Search
CPC ............................................ G06T 11/20–11/40
See application file for complete search history.

(56) References Cited

U.S. PATENT DOCUMENTS

| | | | |
|---|---|---|---|
| 8,553,032 B1 * | 10/2013 | Poston | 345/423 |
| 2004/0189665 A1 * | 9/2004 | Perry | G06T 15/503 345/611 |
| 2004/0189666 A1 | 9/2004 | Frisken et al. | |
| 2004/0193389 A1 * | 9/2004 | Perry | G06F 17/214 703/2 |
| 2007/0002054 A1 | 1/2007 | Bronstein | |
| 2007/0139413 A1 | 6/2007 | Stamm et al. | |
| 2009/0027398 A1 * | 1/2009 | Frisken | 345/442 |
| 2009/0102846 A1 | 4/2009 | Flockermann et al. | |
| 2010/0164984 A1 * | 7/2010 | Rane et al. | 345/611 |
| 2012/0092345 A1 | 4/2012 | Joshi et al. | |
| 2013/0002678 A1 * | 1/2013 | Cornell | 345/467 |

FOREIGN PATENT DOCUMENTS

| | | |
|---|---|---|
| EP | 2107528 | 10/2009 |
| KR | 10-2007-0037769 | 4/2007 |

OTHER PUBLICATIONS

International Search Report & Written Opinion, PCT/US2012/050385, dated Feb. 28, 2013, 8 pages.
Extended European Search Report for European Application No. 12882669.0, dated Mar. 21, 2016, 9 pages.
International Preliminary Report on Patentability for International Application No. PCT/US2012/050385, dated Feb. 19, 2015, 8 pages.
Zheng et al., "Real-time texture-mapped vector glyphs," ACM Siggraph Symposium on Interactive 3D Graphics and Games: Redwood City, Mar. 14-17, 2006, Jan. 1, 2006, pp. 125-132, DOI: 10.1145/1111411.1111433.

* cited by examiner

*Primary Examiner* — Tize Ma
(74) *Attorney, Agent, or Firm* — Fish & Richardson P.C.

(57) ABSTRACT

A system includes a first computing device that includes a memory configured to store instructions. The first computing device also includes a processor to execute the instructions to perform a method that includes receiving data representing a collection of line segments that represent a glyph. The method also includes, for each line segment, defining a cell that substantially encapsulates the line segment. At least one side of the cell is defined by bisecting an angle defined by the line segment and an adjacent line segment. The method also includes determining a value for a portion of the defined cell based upon the distance between the portion of the cell and the corresponding line segment.

36 Claims, 10 Drawing Sheets

PRODUCING GLYPH DISTANCE FIELDS

BACKGROUND

This description relates to producing distance fields to prepare glyphs for rendering and other processes.

To digitally present text and similar graphics, various types of font families (e.g., Times New Roman, Arial, etc.) may be used that typically include a set of fonts, e.g., regular, italic, bold and bold italic. Each font includes a set of individual character shapes called glyphs and each glyph can be distinguished by its various design features (e.g., geometry, stroke thickness, serifs, size, etc.) One or more techniques may be utilized for representing such fonts; for example, outline-based representations have been adopted in which lines and curves are used to define the borders of glyphs. Scalable to a variety of sizes, outline fonts can be processed for rendering on various types of output devices.

SUMMARY

The systems and techniques described here relate to processing line segments of glyph outlines for presentation on an output device; for example, a display of a computing device.

In one aspect, a computer-implemented method includes receiving data representing a collection of line segments that represent a glyph. The method also includes, for each line segment, defining a cell that substantially encapsulates the line segment. At least one side of the cell is defined by bisecting an angle defined by the line segment and an adjacent line segment. The method also includes determining a value for a portion of the defined cell based upon the distance between the portion of the cell and the corresponding line segment.

Implementations may include one or more of the following features. The cell may take the form of one or more shapes, for example, the cell may be trapezoid shaped, triangle shaped, etc. The method may further include if multiple values are determined for the portion of the defined cell, a minimum value may be determined from the multiple values. The portion of the defined cell may represent a pixel. The distance between at least two sides of the cell may be previously defined. For example, the distance between at least two sides of the cell may be defined from a continuous stroke modulation value. At least a second side of the cell may be located at a distance of half a continuous stroke modulation value. The glyph may be defined by at least one of a quadratic polynomial and a cubic polynomial. The glyph may be a portion of a character in a font set.

In another aspect, a system includes a first computing device that includes a memory configured to store instructions. The first computing device also includes a processor to execute the instructions to perform a method that includes receiving data representing a collection of line segments that represent a glyph. The method also includes, for each line segment, defining a cell that substantially encapsulates the line segment. At least one side of the cell is defined by bisecting an angle defined by the line segment and an adjacent line segment. The method also includes determining a value for a portion of the defined cell based upon the distance between the portion of the cell and the corresponding line segment.

Implementations may include one or more of the following features. The cell may take the form of one or more shapes, for example, the cell may be trapezoid shaped, triangle shaped, etc. The processor may execute the instructions to determine, if multiple values are determined for the portion of the defined cell, a minimum value from the multiple values. The portion of the defined cell may represent a pixel. The distance between at least two sides of the cell may be previously defined. For example, the distance between at least two sides of the cell may be defined from a continuous stroke modulation value. At least a second side of the cell may be located at a distance of half a continuous stroke modulation value. The glyph may be defined by at least one of a quadratic polynomial and a cubic polynomial. The glyph may be a portion of a character in a font set.

In another aspect, one or more computer readable media storing instructions that are executable by a processing device, and upon such execution cause the processing device to perform operations that include receiving data representing a collection of line segments that represent a glyph. Operations also include, for each line segment, defining a cell that substantially encapsulates the line segment. At least one side of the cell is defined by bisecting an angle defined by the line segment and an adjacent line segment. Operations also include determining a value for a portion of the defined cell based upon the distance between the portion of the cell and the corresponding line segment.

Implementations may include one or more of the following features. The cell may take the form of one or more shapes, for example, the cell may be trapezoid shaped, triangle shaped, etc. The computer readable media may store further instructions that are executable by a processing device, and upon such execution cause the processing device to perform operations that may include, if multiple values are determined for the portion of the defined cell, determining a minimum value from the multiple values. The portion of the defined cell may represent a pixel. The distance between at least two sides of the cell may be previously defined. For example, the distance between at least two sides of the cell may be defined from a continuous stroke modulation value. At least a second side of the cell may be located at a distance of half a continuous stroke modulation value. The glyph may be defined by at least one of a quadratic polynomial and a cubic polynomial. The glyph may be a portion of a character in a font set.

These and other aspects and features and various combinations of them may be expressed as methods, apparatus, systems, means for performing functions, program products, and in other ways.

Other features and advantages will be apparent from the description and the claims.

DETAILED DESCRIPTION

Figure 1:
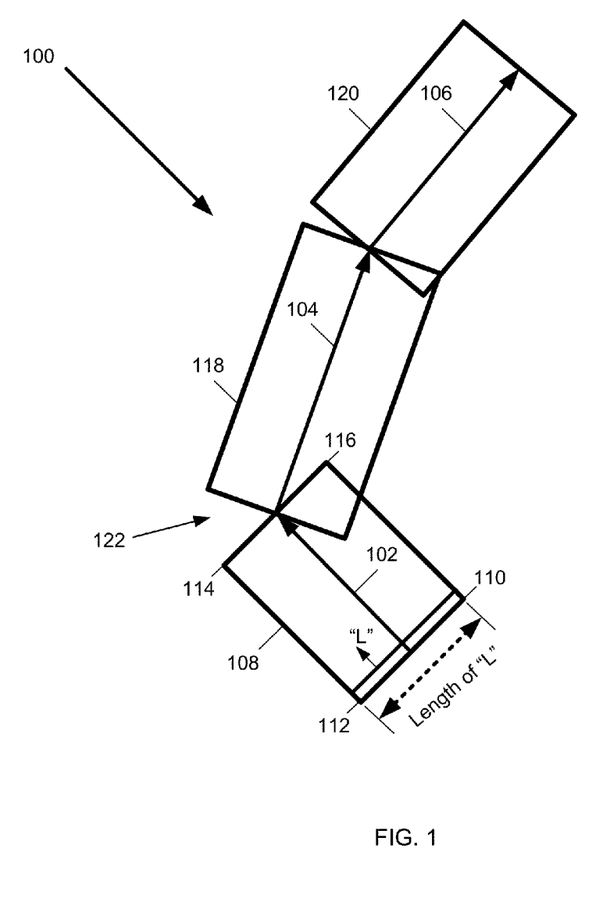
FIGS. 1 and 2 illustrate using rectangular boundary cells for glyph line segments.

Referring to FIG. 1, using an outline font technique, the borders of a glyph of a particular font may be defined as a set of lines and curves. Typically, relatively small discrete line segments are used to approximate the continuous nature of these lines and curves. Due to potentially abrupt transitions between these line segments, the overall lines and curves may appear jagged to an end viewer. To reduce this visual effect, the line segments may be blurred by appropriately assigning gray levels to the points (e.g., pixels) included in the segments or located nearby (e.g., adjacent to) the points of the line segments (e.g., using a process referred to as antialiasing). One or more techniques may be implemented to introduce such antialiasing to line segments that define the lines and/or curves of the glyph. For example, a distance-based antialiasing technique may be used for defining the gray scale values by computing a distance field, which is a scalar field that specifies a distance to the glyph. The distance field of a glyph measures the minimum distance from any point (e.g., representing a pixel) to the edge of the glyph outline. One or more techniques may also be implemented for defining the points (e.g., pixels) associated with the distance field. For example, rather than using points that are evenly distributed, the points of the distance field may be irregularly sampled based upon the distance of the sample points. In one technique (referred to as adaptive distance fields (ADFs), the amount of distance point samples increase as the distance between points changes at a more rapid rate.

Different conventions may be used for indicating if a point is located inside the outline of the glyph or outside the outline of the glyph. For one convention, negative distances may be used to define a point located exterior to the outline of the glyph and positive distances used to define points located interior to the glyph outline. Once distance values are determined, the distance field may be used to determine the visual characteristic (e.g., gray scale value) of the individual points (e.g., pixels). For example, one or more thresholds may be defined for use in filtering the distance field values for presentation. In one arrangement, one or more continuous stroke modulation (CSM) cutoff values may be applied to the distance values for defining identifying gray scale values to be presented.

As represented in the figure, a contour 100 of a glyph is represented by a set of connected polynomials (or arcs) that form a closed outline. To render the glyph contour (e.g., during an edge rendering process), the outline of the contour is converted into a collection of small line segments (e.g., represented by segments 102, 104, 106). For each line segment that defines the contour, a distance field and sample points (e.g., by implementing ADF) are determined. Focusing on line segment 102 as an example in this arrangement, a distance field is defined by sweeping a perpendicular line segment "L" from one end of the line segment 102 to the other end to form the rectangular boundary cell 108. The length of the perpendicular line segment "L", which defines the width of the rectangular boundary cell 108 may be defined by one or more quantities. For example, the length may be defined as being equivalent to twice the quantity (referred to as a filter radius) provided by the CSM values. From this defined length and sweeping the perpendicular line segment "L" over the line segment 102, four vertices 110, 112, 114, 116 define four lines that form the rectangular boundary cell 108. For line segments 104 and 106, similar rectangular boundary cells 118 and 120 may be formed in a similar manner. Once defined, the boundary cells can be used for computing a distance field dependent upon a selected convention; for example, points located interior to the glyph's outline may be assigned positive distance values and points located exterior to the outline may be assigned negative distance values. For each sampled point, an intensity value (e.g., gray scale level) may be mapped for rendering the glyph.

Figure 2:
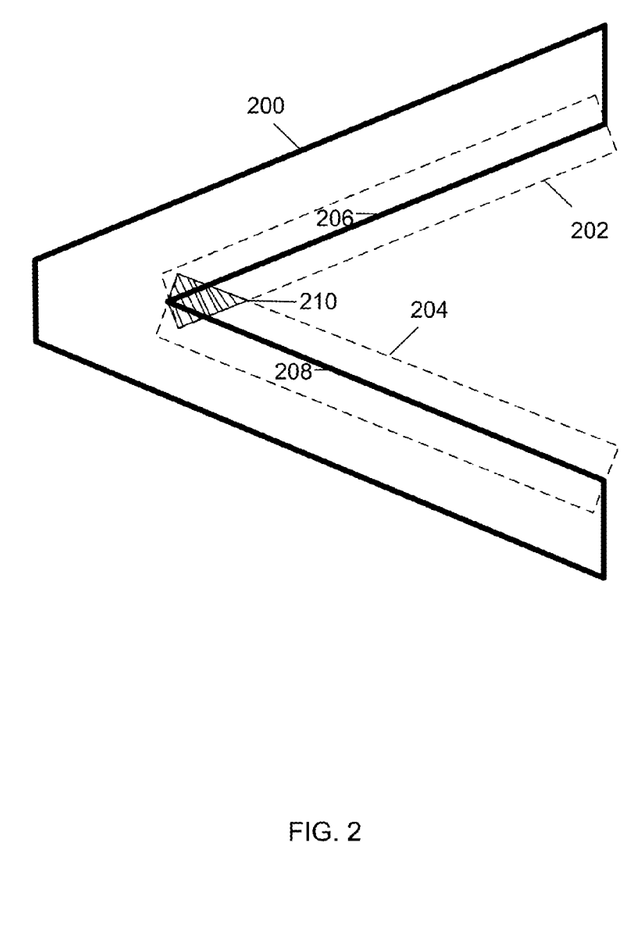
Figure 3:
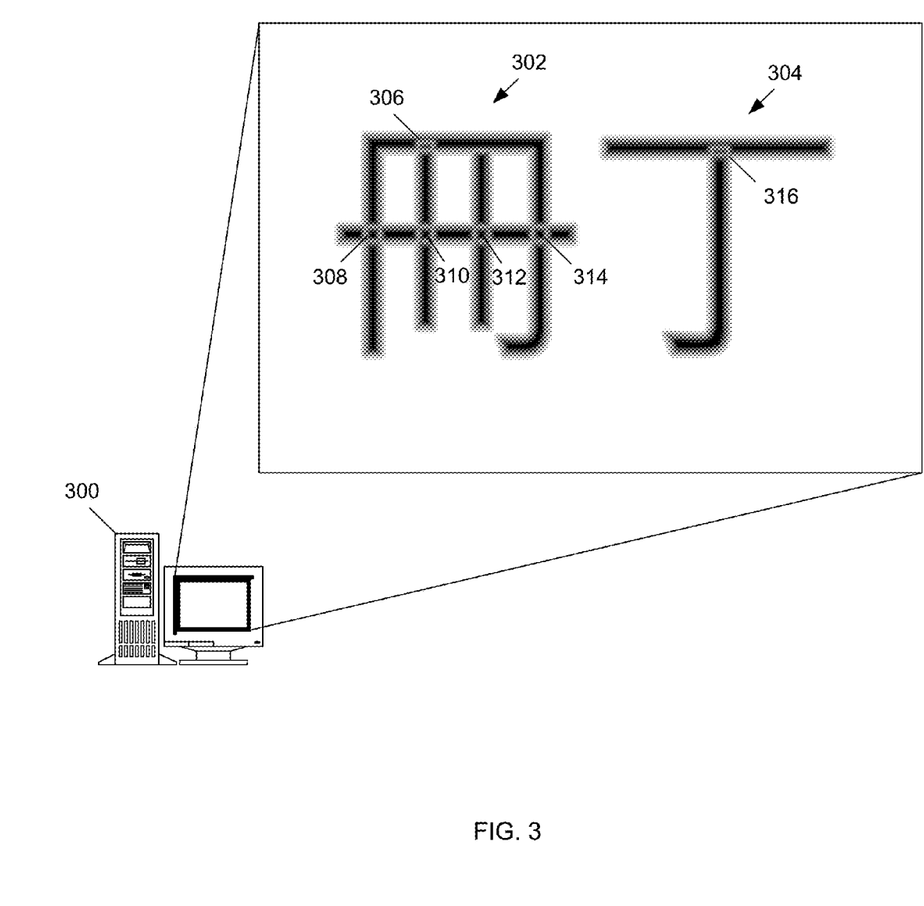
FIG. 3 illustrates font characters rendered by using rectangular boundary cells.

Based upon the layout orientation of the line segments (e.g., segments 102, 104, 106) gaps may form between the corresponding rectangular boundary cells (e.g., cells 108, 118, 120). For example, arrow 122 identifies a gap between the rectangular boundary cells 108 and 118 that includes space not used for computing distance fields for the glyph. To address such gaps, some conventional techniques introduce additional rectangular boundary cells to cover these gaps and compute respective distance fields that may be merged with the distance fields of other rectangular boundary cells and a minimum signed distance is retained at each point in space defined by the boundary cells. The process of computing values for distance fields for rectangular boundary cells for each line segment along with the additional boundary cells for filling gaps can be computationally intensive and redundant. Further, introducing additional boundary cells may cause cell overlap that may lead to undesirable graphical effects on the glyph being rendered. For example, referring to FIG. 2, a character 200 is presented that represents a "less than" character and two rectangular boundary cells 202, 204 are produced for computing distance fields for respective line segments 206, 208. Due to their rectangular shape and orientation, an overlap region 210 is formed by the two rectangular boundary cells 202, 204. From the two distance fields computed for the two boundary cells, undesirable graphical effects may be presented in the overlap region 210 when rendering the glyph. For example, referring to FIG. 3, a sequence of Asian characters (e.g., including characters 302, 304) is illustrated as being presented on the display of a computer system 300. Using rectangular boundary cells to compute distance fields for line segments of the characters 302, 304, overlapping regions are formed that render graphical artifacts. In particular, character 302 includes overlap artifacts 306, 308, 310, 312, 314 and character 304 includes overlap artifact 316. As such, along with performing redundant operations for computing portions of distance fields for equivalent areas of space, undesirable artifacts may be rendered as a result of overlapping boundary cell regions.

Figure 4:
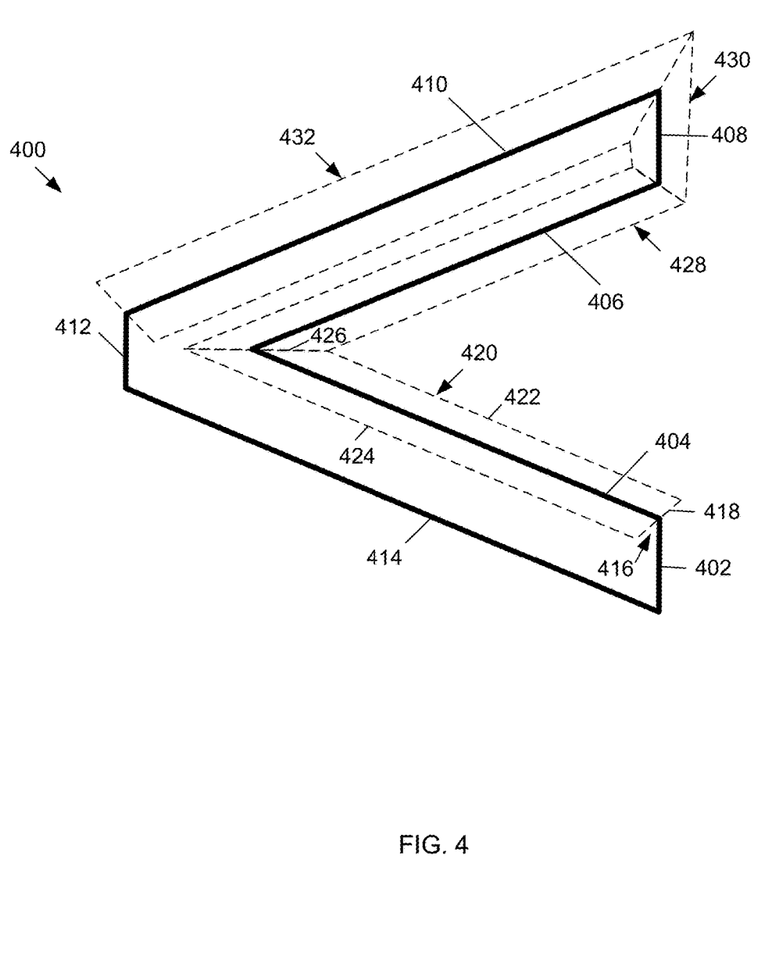
FIG. 4 illustrates using trapezoid shaped boundary cells for glyph line segments.

One or more techniques and methodologies may be implemented for reducing redundant computations and improving computational efficiency and output quality. For example, boundary cells may be defined such that boundary cell overlap is reduced along with the need of introducing additional boundary cells, e.g., for filling gaps formed between two or more cells. In one arrangement, a bisector of an angle defined by two line segments is used to define adjacent boundary cells. By using an angle bisector, boundary cell shapes may be produced such as trapezoid shaped cells that are non-overlapping and have reduced gaps between adjacent cells. Referring to FIG. 4, a "less than" character 400 is illustrated that includes seven line segments 402, 404, 406, 408, 410, 412, 414. For each angle formed between adjacent line segments, a bisecting angle is defined. For example, an angle 416 is formed by the line segments 402 and 404. By bisecting the angle, one leg 418 of a trapezoidal shaped boundary cell 420 may be defined. Based upon a cell length (e.g., defined by a CSM value), two legs 422 and 424 extend along the line segment 404 until meeting a leg 426, which is defined by bisecting an angle formed by the line segment 404 meeting the adjacent line segment 406. As illustrated, traveling from line segment to line segment of the character 400 in a counterclockwise manner, similar trapezoidal shaped boundary cells 428, 430, 432 are defined based upon bisecting the angles formed by adjacent line segments. Since a bisected angle is used for defining a leg that is common to adjacent trapezoids, overlap is minimized and any gap between boundary cells is substantially reduced. As such, executing redundant computation operations for addressing cell overlap and gaps is similarly reduced to improve computational efficiency.

Figure 5:
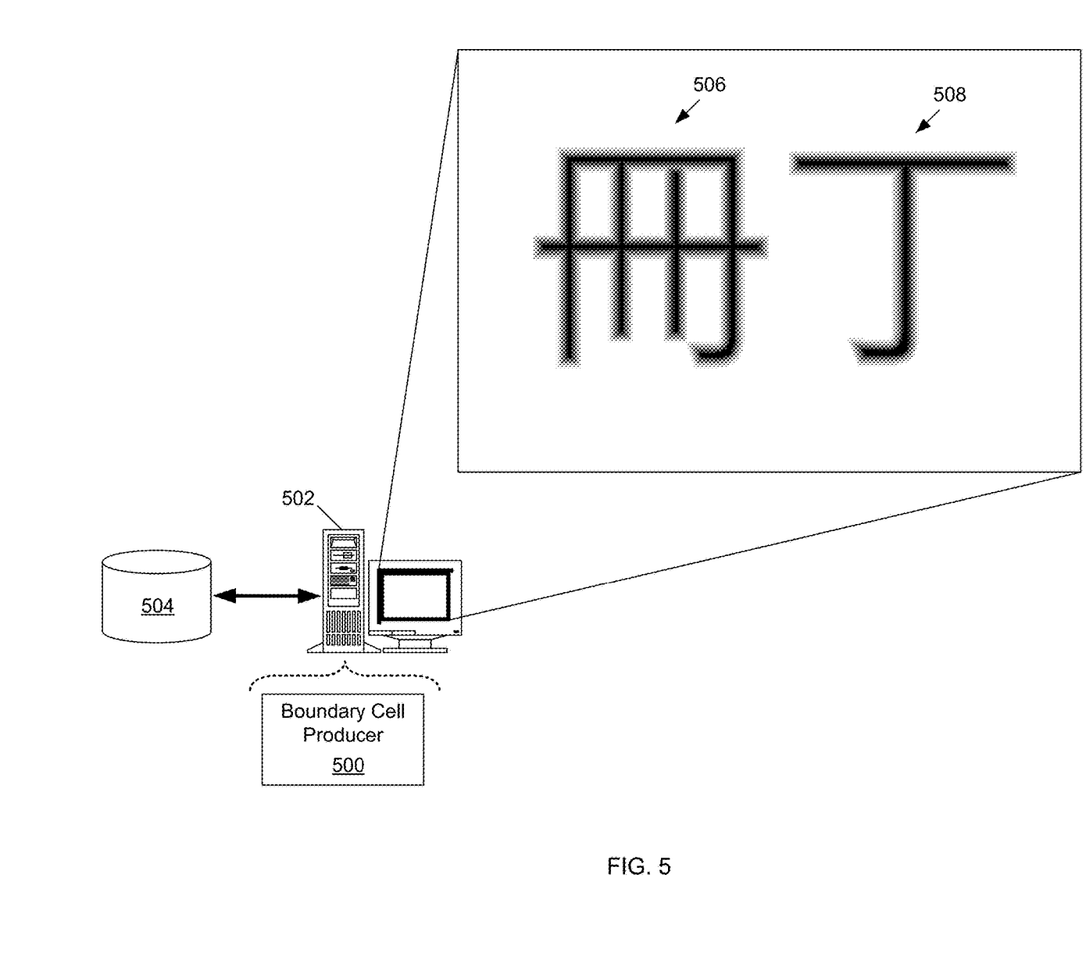
FIG. 5 illustrates font characters rendered by using trapezoid shaped boundary cells.

Referring to FIG. 5, one or more arrangements may be implemented for computationally bisecting angles between adjacent line segments of a glyph to produce boundary cells for distance field computations. For example, a boundary cell producer 500 may be executed by a computing device (e.g., a computer system 502) to perform operations for bisecting angles formed by adjacent line segments, defining boundary cells, computing distance fields, etc. Distributed processing techniques may also be implemented for executing operations on one computing device (e.g., by using multiple processes) or through the use of multiple computing devices. By performing the operations, glyphs, characters, etc. may be efficiency produced and rendered with a reduced amount of undesirable graphical artifacts. As illustrated in the figured, Asian characters 506, 508 are produced from boundary cells defined by bisecting angles of adjacent line segments of the character glyphs. Compared to the characters 302, 304 presented in FIG. 3, the number of undesirable graphical artifacts is significantly reduced.

Figure 6:
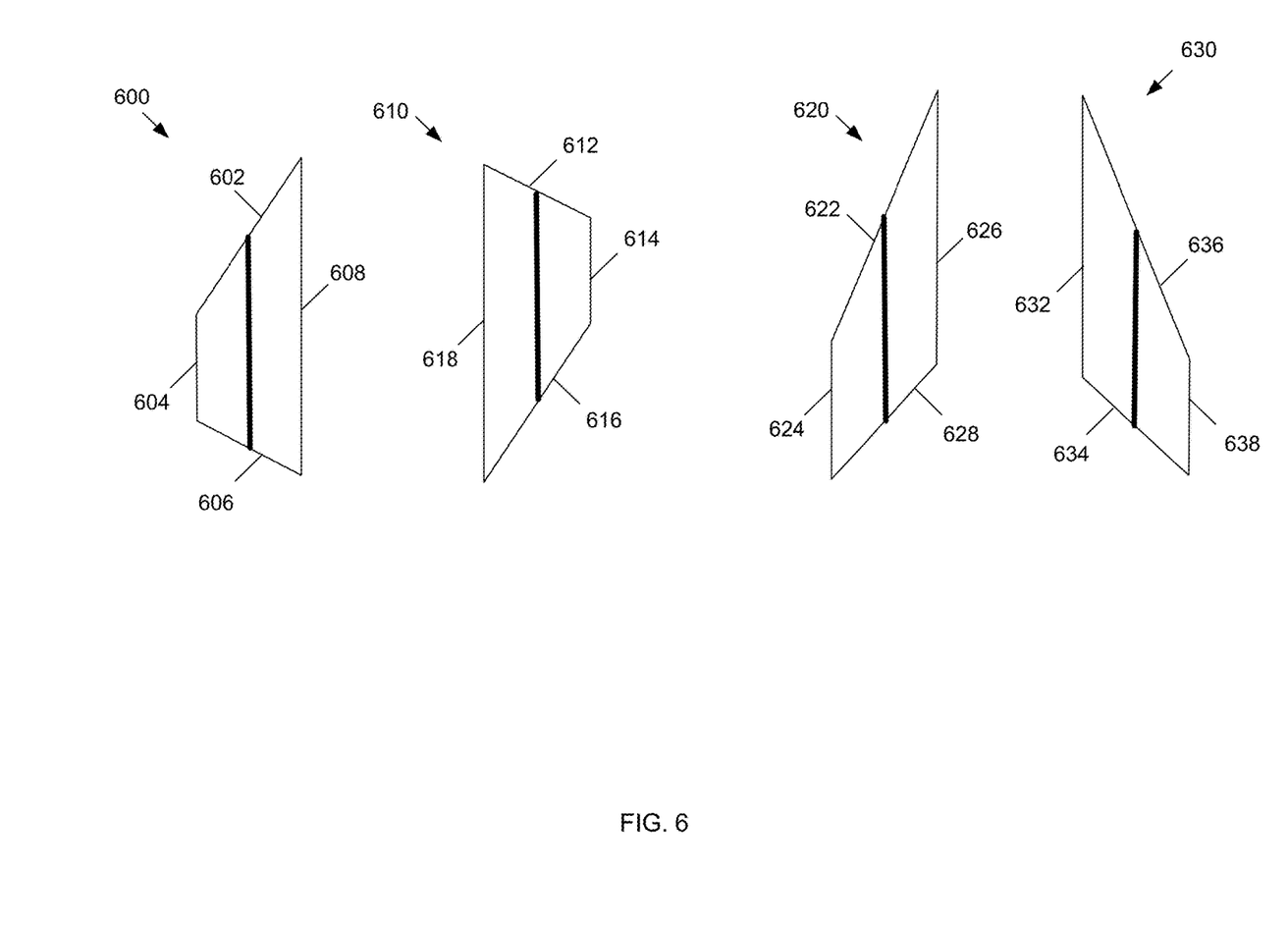
FIGS. 6 and 7 illustrate using bisecting an angle to define boundary cells.

Referring to FIG. 6, various types of trapezoidal shapes may be used for defining cell boundaries. Typically, the legs of the trapezoids are defined by the bisecting angles formed from the adjacent line segments and the bases of the trapezoids are defined from the length "L" (e.g., a CSM value) that extends between the legs. Different conventions may also be implemented to define the trapezoids and their orientations. For example, a trapezoid shaped boundary cell 600 may be considered as having three left edges 602, 604, 606 and one right edge 608. Correspondingly, another trapezoid shaped boundary cell 610 may be defined as having three right edges 612, 614, 616 and one left edge 618. In another example, one trapezoid shaped boundary cell 620 may be considered as having two left edges 622, 624 and two right edges 626, 628. Similarly, a mirror image boundary cell 630 may have two left edges 632, 634 and two right edges 636, 638 reversed.

Figure 7:
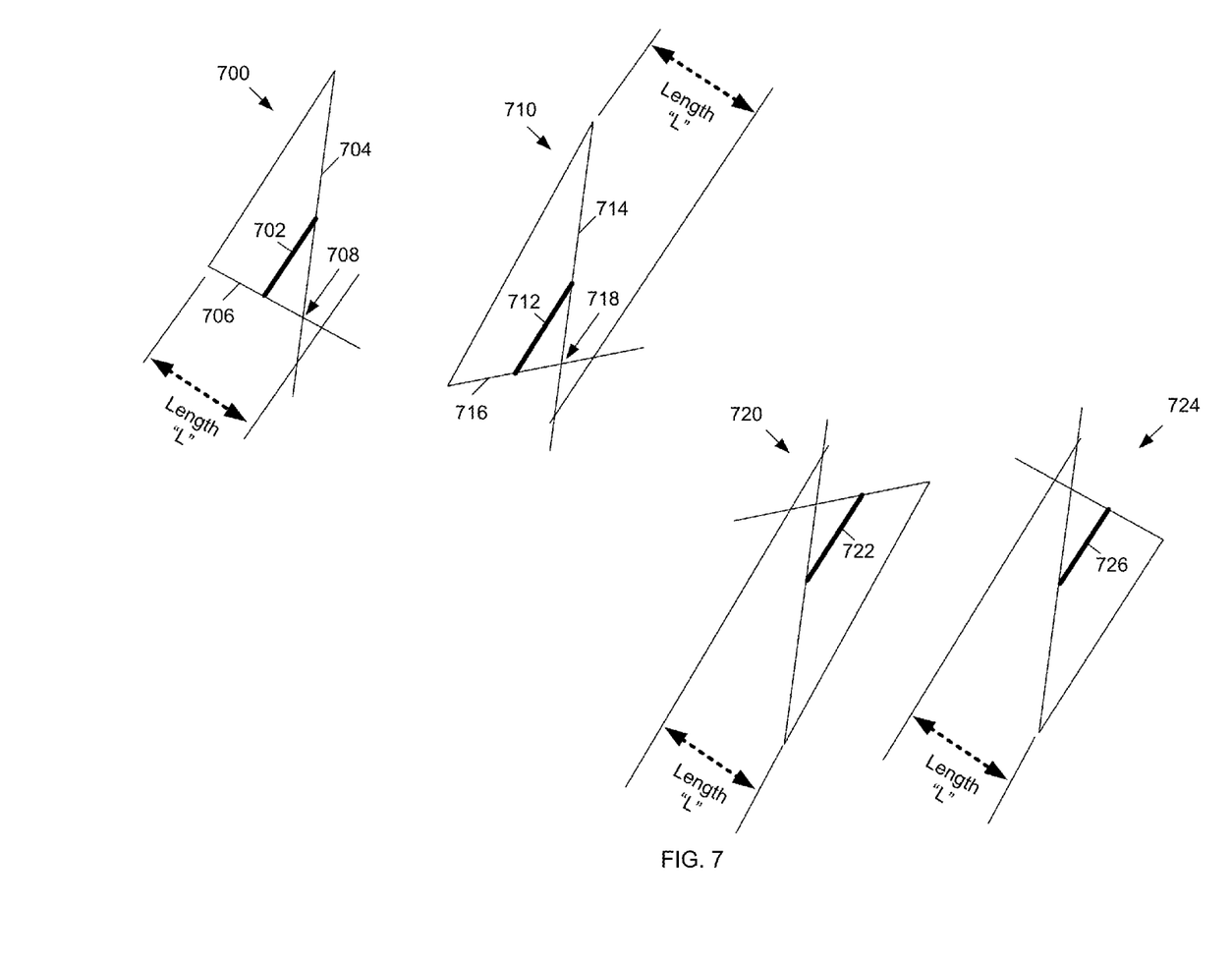

Referring to FIG. 7, in some arrangements, the length "L" used to define the distance field (e.g., the CSM value) has a relatively large value with respect to the size of the glyph line segments and boundary cells may take other shapes as defined by bisecting angles formed by adjacent line segments. For example, triangular shaped boundary cells may be produced. One example for producing such shapes includes the situation in which the lines that extend along the bisected angle intersect prior to fully extending the length "L". Illustrated in the figure, for one situation a triangular shaped boundary cell 700 is formed about line segment 702 when two legs 704, 706 intersect at point 708 prior to extending to half of the length "L". A similar situation is illustrated for a triangular shaped boundary cell 710 formed about a line segment 712. Two legs 714, 716 are defined by bisecting angles formed by the segment line 712 and respective adjacent line segments (not shown). As the legs 714, 716 extend, the two intersect at a point 718 that is located a distance less than half the length of "L" (that defines the distance field cutoff). Similar conditions are illustrated for triangular boundary cell 720 (for line segment 722) and cell 724 (for line segment 726).

Figure 8:
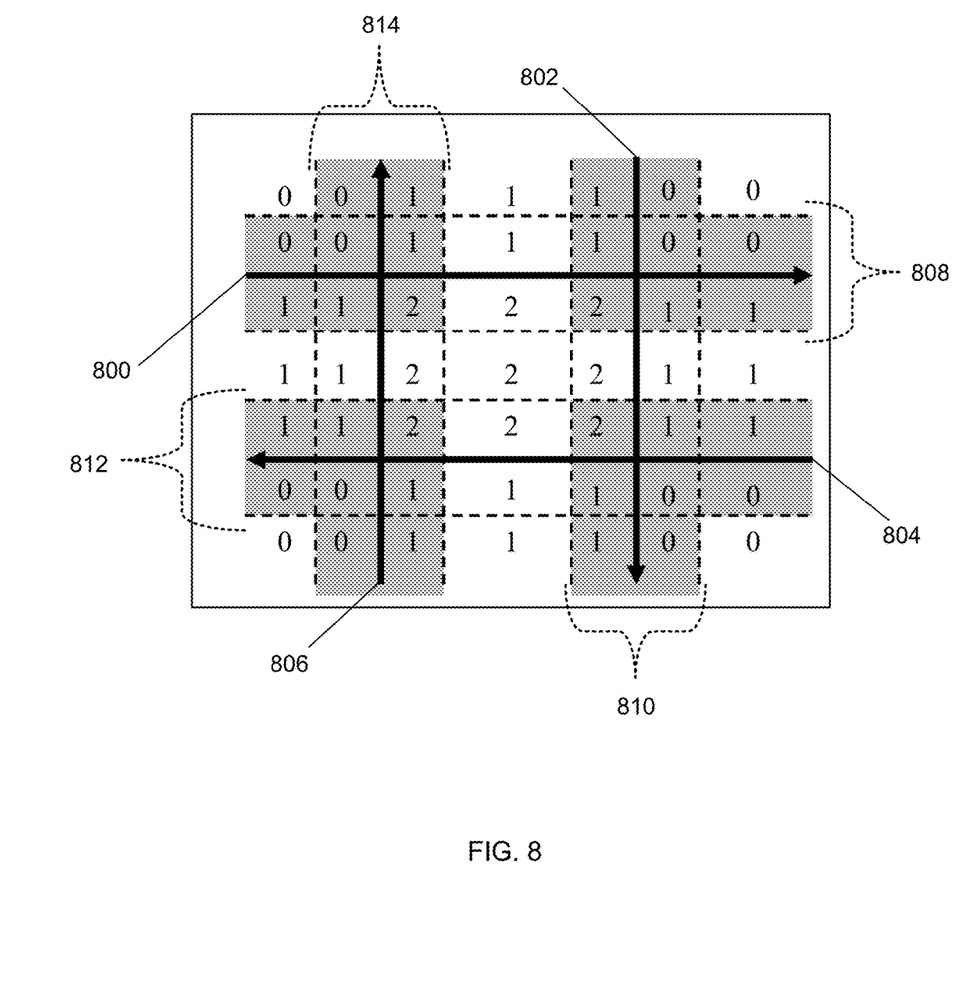
FIG. 8 illustrates winding numbers of overlapping boundary cells.

Referring to FIG. 8, along with producing undesirable artifacts in glyphs, overlapping of boundary cells may inappropriately influence other processes associated with rendering characters. For example, a quantity referred to as a winding number may be used to determine which distance field value to assign to a pixel. However, for situations in which boundary cells overlap, winding numbers may incorrectly reflect which distance field value should be assigned. For example, as illustrated in the figure, four line segments 800, 802, 804, 806 are presented in an overlapping pattern. Due to the overlapping of the lines, corresponding rectangular boundary cells 808, 810, 812, 814 overlap. Regions are defined by the boundary cells and a winding number is assigned to each region which in turn is used for determining the distance field value. For each shaded region illustrated in the figure, a winding number should be computed while for non-shaded regions, a distance field value is not to be computed. However, as illustrated, based upon the overlapping boundary cells, winding numbers have been computed for the non-shaded regions. As such, overlapping rectangular boundary cells may produce winding numbers that may cause distance field values being incorrectly assigned to regions of a glyph.

One or more techniques and implementations may be used for processing potentially overlapping contours of a glyph. For example, separate portions of memory in a computing device may be used for boundary cell processing to produce distance field values. In one arrangement, two buffers associated with the regions (e.g., pixels) of a glyph may be used (e.g., one referred to as a boundary cell buffer and one referred to as a distance field buffer) for such computations. In instances when a boundary cell is used to compute a distance field value for a region (e.g., pixel) assigned a winding number that has an absolute value greater than one (and may be located interior to the glyph's outline), the computed distance value is initially stored in the boundary cell buffer rather than the distance field buffer. For subsequent distance field value computations involving the same region (e.g., due to other boundary cells), the minimum distance field value is determined for the region by using the stored information in the boundary cell buffer and the minimum distance field value is then provided to the distance field buffer for further processing.

Figure 9:
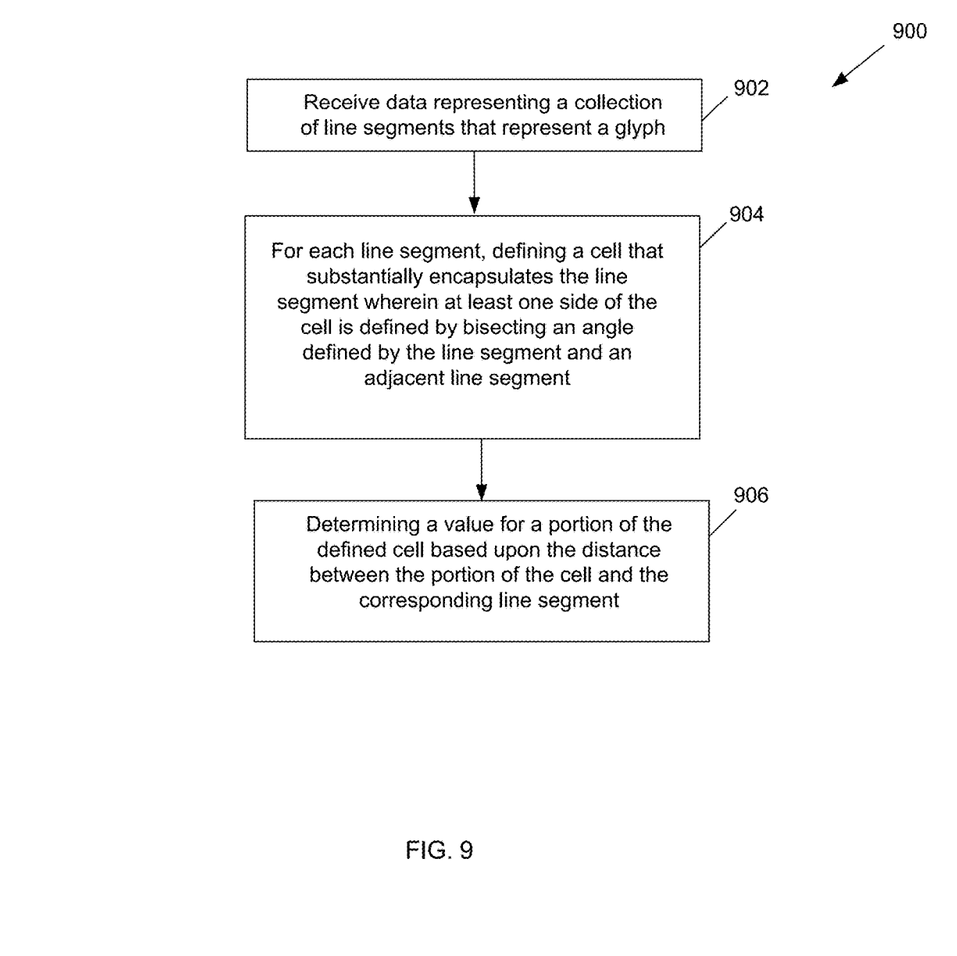
FIG. 9 is an example flow chart of operations of a boundary cell producer.

Referring to FIG. 9, a flowchart 900 represents operations of a boundary cell producer (e.g., the boundary cell producer 500 shown in FIG. 5). Operations of the boundary cell producer are typically executed by a single computing device (e.g., the computer system 500); however, operations of the boundary cell producer may be executed by multiple computing devices. Along with being executed at a single site, operation execution may be distributed among two or more locations.

Operations of the boundary cell producer may include receiving 902 data representing a collection of line segments that represent a glyph. For example the line segments may represent a glyph from a character in a particular font set. Operations may also include, for each segment, defining 904 a cell that substantially encapsulates the line segment. At least one side of the cell is defined by bisecting an angle defined by the line segment and an adjacent line segment. For example, by bisecting the angle formed by the line segments, a trapezoidal shaped, triangular shaped, etc.

boundary cell may be produced such that corresponding cells for adjacent line segments may be substantially non-overlapping. Operations may also include determining 906 a value for a portion of the defined cell based upon the distance between the portion of the cell and the corresponding line segment. For example, a distance field value may be determined for a cell portion that represents a pixel and the determined distance field value may be used for rendering the glyph (or corresponding font character) represented by the line segment collection.

Figure 10:
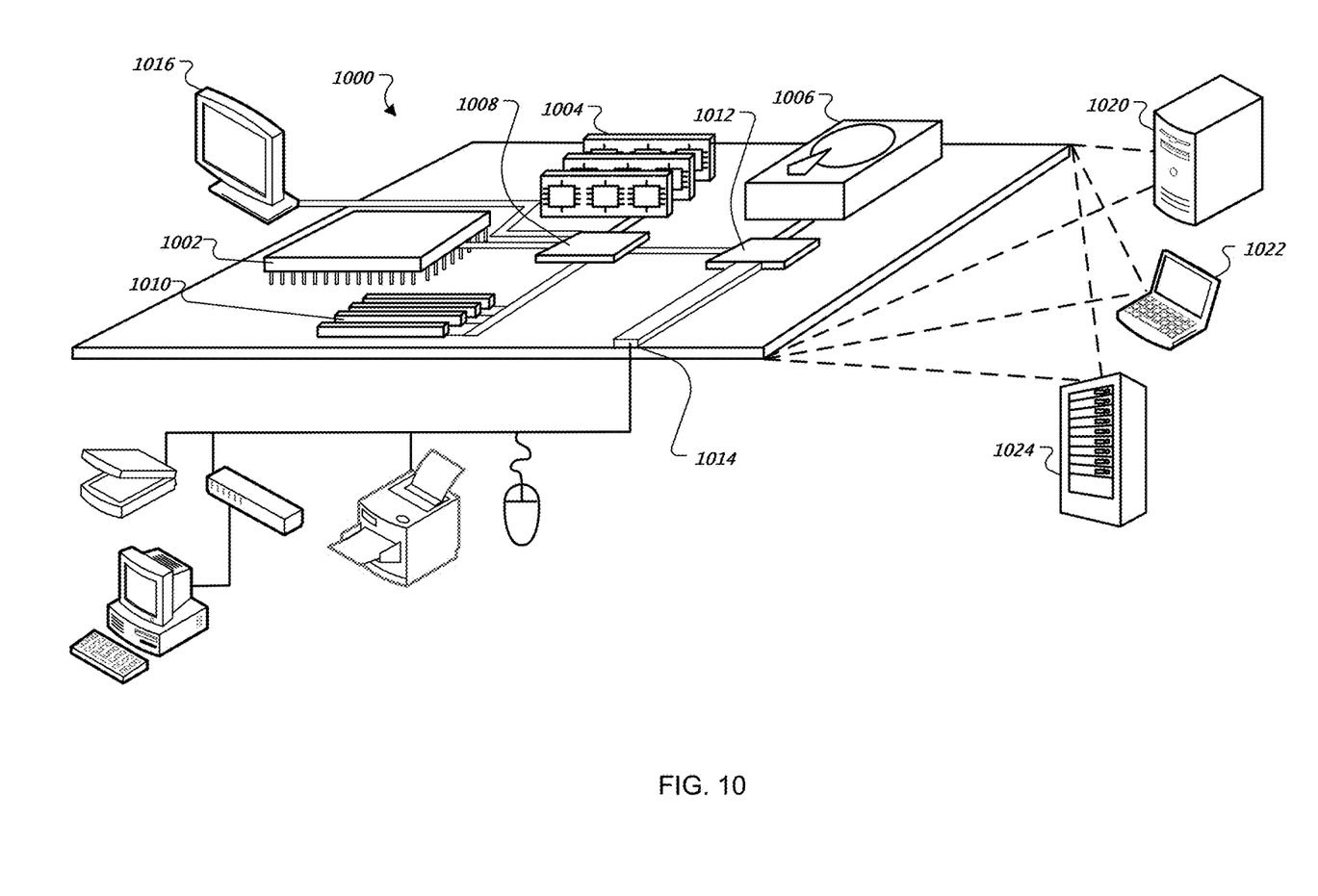
FIG. 10 is a block diagram of computing devices and systems.

FIG. 10 is a block diagram of computing systems 1000 that may be used and implemented to perform operations associated with the boundary cell producer 500. Computing device 1000 is intended to represent various forms of digital computers, such as laptops, desktops, workstations, personal digital assistants, servers, blade servers, mainframes, and other appropriate computers. The computing device 1000 may also be incorporated into other devices such as printers, scanners, etc.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and can be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses can be used, as appropriate, along with multiple memories and types of memory. Also, multiple computing devices 1000 can be connected, with each device providing portions of the necessary operations (e.g., as a server bank, a group of blade servers, or a multi-processor system).

The memory 1004 stores information within the computing device 1000. In one implementation, the memory 1004 is a computer-readable medium. In one implementation, the memory 1004 is a volatile memory unit or units. In another implementation, the memory 1004 is a non-volatile memory unit or units.

The storage device 1006 is capable of providing mass storage for the computing device 1000. In one implementation, the storage device 1006 is a computer-readable medium. In various different implementations, the storage device 1006 can be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1004, the storage device 1006, memory on processor 1002, or the like.

The high speed controller 1008 manages bandwidth-intensive operations for the computing device 1000, while the low speed controller 1012 manages lower bandwidth-intensive operations. Such allocation of duties is exemplary only. In one implementation, the high-speed controller 1008 is coupled to memory 1007, display 1016 (e.g., through a graphics processor or accelerator), and to high-speed expansion ports 1010, which can accept various expansion cards (not shown). In the implementation, low-speed controller 1012 is coupled to storage device 1006 and low-speed expansion port 1014. The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1000 can be implemented in a number of different forms, as shown in the figure. For example, it can be implemented as a standard server 1020, or multiple times in a group of such servers. It can also be implemented as part of a rack server system 1024. In addition, it can be implemented in a personal computer such as a laptop computer 1022. Alternatively, components from computing device 1000 can be combined with other components in a mobile device (not shown).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
    receiving, by the computer, data representing a collection of line segments that represent a glyph;
    for each line segment in the collection that represents the glyph, defining a cell that substantially encapsulates the line segment representing the glyph, wherein at least one side of the cell is defined by bisecting an angle defined by the line segment and an adjacent line segment;
    determining a visual characteristic value for a portion of the defined cell based upon one or more thresholds being applied to a minimum distance between a point in the portion of the cell and the corresponding line segment, wherein determining the visual characteristic value accounts for overlap of the portion of the defined cell by a portion of another cell that has a visual characteristic value; and
    displaying a rendering of the glyph, at the computer, by presenting the determined visual characteristic value of the portion of the defined cell.

2. The computer-implemented method of claim 1, wherein the cell is trapezoid shaped.

3. The computer-implemented method of claim 1, wherein the cell is triangle shaped.

4. The computer-implemented method of claim 1, further comprising:
    if multiple values are determined for the portion of the defined cell, determining a minimum value from the multiple values.

5. The computer-implemented method of claim 1, wherein the portion of the defined cell represents a pixel.

6. The computer-implemented method of claim 1, wherein the distance between at least two sides of the cell is previously defined.

7. The computer-implemented method of claim 1, wherein the distance between at least two sides of the cell is defined from a continuous stroke modulation value.

8. The computer-implemented method of claim 1, wherein at least a second side of the cell is located at a distance of half a continuous stroke modulation value.

9. The computer-implemented method of claim 1, wherein the glyph is defined by at least one of a quadratic polynomial and a cubic polynomial.

10. The computer-implemented method of claim 1, wherein the glyph is a portion of a character in a font set.

11. The computer-implemented method of claim 1, wherein a size of the defined cell is variable.

12. A system comprising:
    a computing device comprising:
        a memory configured to store instructions; and a processor to execute the instructions to perform a method comprising:

receiving, by the processor, data representing a collection of line segments that represent a glyph;

for each line segment in the collection that represents the glyph, defining a cell that substantially encapsulates the line segment representing the glyph, wherein at least one side of the cell is defined by bisecting an angle defined by the line segment and an adjacent line segment;

determining a visual characteristic value for a portion of the defined cell based upon one or more thresholds being applied to a minimum distance between a point in the portion of the cell and the corresponding line segment, wherein determining the visual characteristic value accounts for overlap of the portion of the defined cell by a portion of another cell that has a visual characteristic value; and displaying a rendering of the glyph, at the computing device, by presenting the determined visual characteristic value of the portion of the defined cell.

13. The system of claim 12, wherein the cell is trapezoid shaped.

14. The system of claim 12, wherein the cell is triangle shaped.

15. The system of claim 12, wherein the processor executes the instructions to determine, if multiple values are determined for the portion of the defined cell, a minimum value from the multiple values.

16. The system of claim 12, wherein the portion of the defined cell represents a pixel.

17. The system of claim 12, wherein the distance between at least two sides of the cell is previously defined.

18. The system of claim 12, wherein the distance between at least two sides of the cell is defined from a continuous stroke modulation value.

19. The system of claim 12, wherein at least a second side of the cell is located at a distance of half a continuous stroke modulation value.

20. The system of claim 12, wherein the glyph is defined by at least one of a quadratic polynomial and a cubic polynomial.

21. The system of claim 12, wherein the glyph is a portion of a character in a font set.

22. The system of claim 12, wherein a size of the defined cell is variable.

23. One or more computer readable storage device storing instructions that are executable by a processing device, and upon such execution cause the processing device to perform operations comprising:

receiving, by the computer, data representing a collection of line segments that represent a glyph;

for each line segment in the collection that represents the glyph, defining a cell that substantially encapsulates the line segment representing the glyph, wherein at least one side of the cell is defined by bisecting an angle defined by the line segment and an adjacent line segment;

determining a visual characteristic value for a portion of the defined cell based upon one or more thresholds being applied to a minimum distance between a point in the portion of the cell and the corresponding line segment, wherein determining the visual characteristic value accounts for overlap of the portion of the defined cell by a portion of another cell that has a visual characteristic value; and displaying a rendering of the glyph, at the computer, by presenting the determined visual characteristic value of the portion of the defined cell.

24. The computer readable storage device of claim 23, wherein the cell is trapezoid shaped.

25. The computer readable storage device of claim 23, wherein the cell is triangle shaped.

26. The computer readable storage device of claim 23, further storing instructions that are executable by a processing device, and upon such execution cause the processing device to perform operations comprising:

if multiple values are determined for the portion of the defined cell, determining a minimum value from the multiple values.

27. The computer readable storage device of claim 23, wherein the portion of the defined cell represents a pixel.

28. The computer readable storage device of claim 23, wherein the distance between at least two sides of the cell is previously defined.

29. The computer readable storage device of claim 23, wherein the distance between at least two sides of the cell is defined from a continuous stroke modulation value.

30. The computer readable storage device of claim 23, wherein at least a second side of the cell is located at a distance of half a continuous stroke modulation value.

31. The computer readable storage device of claim 23, wherein the glyph is defined by at least one of a quadratic polynomial and a cubic polynomial.

32. The computer readable storage device of claim 23, wherein the glyph is a portion of a character in a font set.

33. The computer readable storage device of claim 23, wherein a size of the defined cell is variable.

34. A computer-implemented method comprising:

receiving, by the computer, data representing a collection of line segments that represents a glyph;

for each line segment in the collection of line segments that represents the glyph:

defining a trapezoidal shaped or triangular shaped cell that substantially encapsulates the line segment representing the glyph, wherein at least one side of the cell is defined by bisecting an angle defined by the line segment and an adjacent line segment, determining a minimum distance between a point in a portion of the trapezoidal shaped or triangular shaped cell and the line segment, and determining a visual characteristic value for the portion of the defined cell from one or more thresholds being applied to the determined minimum distance between the portion of the cell and the corresponding line segment, wherein determining the visual characteristic value accounts for overlap of the portion of the defined cell by a portion of another cell that has a visual characteristic value; and displaying a rendering of the glyph, at the computer, by presenting the determined visual characteristic values of the line segments.

35. The computer-implemented method of claim 34, wherein the portion of the trapezoidal shaped or triangular shaped cell represents a pixel.

36. The computer-implemented method of claim 34, wherein the visual characteristic is a gray scale value.

* * * * *

UNITED STATES PATENT AND TRADEMARK OFFICE
CERTIFICATE OF CORRECTION

PATENT NO. : 10,002,448 B2
APPLICATION NO. : 13/571562
DATED : June 19, 2018
INVENTOR(S) : Robert Joseph Taylor and Qun Wu It is certified that error appears in the above-identified patent and that said Letters Patent is hereby corrected as shown below:

On the Title Page

Column 1 (Notice), Line 3, after "0 days.", delete "days."

Signed and Sealed this
Seventh Day of April, 2020

Andrei Iancu
*Director of the United States Patent and Trademark Office*